United States Patent [19] [11] 3,717,672
McGee [45] Feb. 20, 1973

[54] NEUTRALIZATION PROCESS FOR ESTER MATERIALS

[75] Inventor: Robert V. J. McGee, Union, N.J.
[73] Assignee: Esso Research and Engineering Company
[22] Filed: Oct. 22, 1969
[21] Appl. No.: 868,624

[52] U.S. Cl..........260/485 R, 260/404.8, 260/410.6, 260/410.9 R, 260/484 R, 260/485 G, 260/486 R, 260/499
[51] Int. Cl..............................................C07c 69/60
[58] Field of Search....260/486, 485 R, 485 S, 475 B, 260/485 P, 499, 486 R, 410.9, 410.6, 485 G

[56] References Cited

UNITED STATES PATENTS

| | | | |
|---|---|---|---|
| 3,553,238 | 1/1971 | Cenker | 260/475 B |
| 2,131,925 | 10/1938 | Ware | 260/475 B |
| 3,033,895 | 5/1962 | Rehfuss et al. | 260/475 |
| 3,316,223 | 4/1967 | Baer et al. | 260/486 |

FOREIGN PATENTS OR APPLICATIONS

| | | | |
|---|---|---|---|
| 1,494,902 | 8/1967 | France | 260/475 |
| 1,232,581 | 1/1967 | Germany | 260/475 |

Primary Examiner—Lorraine A. Weinberger
Assistant Examiner—E. Jane Skelly
Attorney—Pearlman and Stahl and Bryon O. Dimmick

[57] ABSTRACT

An organic ester, particularly one that is to be employed as a synthetic lubricating oil or as a polymerizable ester for the preparation of a polymeric additive for a lubricating oil or for fuel oil, is treated to remove undesirable acidic constituents therefrom by contacting the ester with dry slacked lime having associated therewith a very small proportion of an ionizing liquid such as water. The acidic constituents of the ester form with the slaked line a filterable curd that is easily separated from the ester. Advantages over prior art processes, such as treatment with aqueous alkaline solutions or percolation through solid beds of alkaline material include avoidance of emulsions, more rapid treatment, less expense, greatly reduced volumes of treating agent, and avoidance of the formation of undesirable eater-soluble metal salts of organic acids.

5 Claims, No Drawings

NEUTRALIZATION PROCESS FOR ESTER MATERIALS

BACKGROUND OF THE INVENTION

This invention concerns a treating process for removing undesired acidic constituents from an organic ester. More particularly, the invention concerns a process for removing unreacted acids as well as other acidic materials such as organic or inorganic acids which may have been employed as catalysts in preparing the ester.

In the preparation of organic esters, it is common practice to employ acid catalysts such as sulfonic acids, phosphoric acid, sulfuric acid, and the like. Also, it frequently happens that in the esterification reaction not all of the organic acid from which the ester is made becomes neutralized. In some esterification reactions a slight excess of the reacting acid is desired. However, the presence of unreacted acid or of residual acid catalyst in the finished ester is frequently undesirable, and removal of these acidic materials becomes necessary. In the past this residual acidity has been reduced by washing with aqueous alkaline solutions or by percolating the ester through a bed of alkali or of alkali impregnated on a suitable support, prior to stripping solvent from the ester. Washing with alkalies, however, frequently results in the formation of stable or slow-setting emulsions. Furthermore, washing alone frequently does not reduce the acidity to a point low enough to be satisfactory. Although the percolation method may reduce the acidity to the desired point, ester-soluble alkali salts of organic acids apparently result, for the esters so treated have been found to possess a high ash content which is undesirable when the esters are to be used as synthetic lubricants, for example.

The emulsification problems that have been referred to, add to the time needed for working up the ester to its final usable form and also cause the loss of a portion of the ester. There have been many attempts to reduce or eliminate such problems, for example, by breaking the emulsion with aliphatic alcohols or the like. In some instances the washing step can be eliminated by treating the ester with ethylene carbonate as taught in U.S. Pat. No. 2,723,286. However, that process requires heating over a period of time, and is applicable primarily to the removal of unreacted acid used in the esterification and is not particularly useful for removal of other acidity, such as that of the inorganic acid catalysts. There is thus still a need for a more universal process for treating esters to reduce acidity which does not involve washing steps.

DESCRIPTION OF THE INVENTION

It has now been found that the acidity of an organic ester can be quickly reduced by contacting the ester with a small proportion of slaked lime, i.e. $Ca(OH)_2$, associated with a small amount of water or other ionizing liquid that is non-reactive with the ester. The amount of slaked lime that is used will be from about 0.3 to 10 wt. % based on the ester. Usually about 1 to 2 wt. % of slaked lime will be sufficient. The slaked lime forms a filterable curd on which the acidic materials become absorbed and are thus completely removed by a filtration step. This process has the advantage of being quicker than any of the previously used processes and of involving a greatly reduced volume of treating material. It is also considerably less expensive than the prior art treating methods.

The process of the present invention is applicable to the treatment of any synthetic organic ester. It is particularly applicable to synthetic ester oils wherein the presence of acidic material has caused a corrosion problem when such esters are used as synthetic lubricants, for example. The process is also particularly applicable to the treatment of polymerizable esters such as the alkyl methacrylates, the alkyl fumarates, and the like, wherein the presence of acidic material has been found to interfere with the desired polymerization reaction to which the esters are subjected in order to prepare usable polymers.

Synthetic ester oils can be characterized as hydrocarbon chains linked together through two to 10 ester linkages. The hydrocarbon chains can be further linked with ether or thioether linkages. Included within the term ester, as diesters, polyesters, and complex esters.

The diesters used as synthetic oils are generally prepared from dicarboxylic acids fully esterified with monohydric alcohols, or from glycols fully esterified with monocarboxylic acids. The total number of carbon atoms in the diester molecule is generally about 18 to 36, preferably 20 to 28. Preferred dicarboxylic diesters are those of the formula:

wherein each R may be the same or different and represents the straight or branched chain alkyl radical of a monohydric alcohol having about six to 13 carbon atoms, while R' is a straight or branched chain $C_2$ to $C_8$ divalent saturated aliphatic hydrocarbon radical. Examples of such diesters include: di-2-ethylhexyl sebacate, di-$C_{10}$ Oxo adipate, di-2,2,4-trimethylpentyl sebacate, di-2-ethylhexyl azelate, $C_8$ Oxo azelate, di-2,2,4-trimethylpentyl azelate, $C_8/C_{10}$ Oxo adipate, di-$C_8$ Oxo trimethyl adipate, di-$C_{13}$ Oxo pimelate, etc. Other diesters are those prepared from glycols and monocarboxylic acids such as dipropylene glycol dipelargonate and polyethylene glycol 200 dicaproate. Oxo alcohols are isomeric mixtures of branched chain aliphatic primary alcohols that are prepared from olefins, such as polymers and copolymers of $C_3$ and $C_4$ monoolefins, by reaction with carbon monoxide and hydrogen in the presence of a cobalt-containing catalyst such as a cobalt carbonyl, at temperatures of about 300° to 400°F., and under pressures of about 1,000 to 3,000 psi. to form aldehydes. The resulting aldehyde product is hydrogenated to form the Oxo alcohol, which is then recovered by distillation from the hydrogenation product.

Polyesters are prepared by reacting polyhydric alcohols such as trimethylolpropane and pentaerythritol with monocarboxylic acids such as butyric acid, caproic acid, caprylic acid, pelargonic acid, etc. to give the corresponding triesters or tetraesters. Complex esters are formed by the esterification interaction of two or more of the following compounds in which at least one polyfunctional alcohol and one polyfunctional acid are employed: (a) Monohydric alcohols; (b) Monobasic acids; (c) Dibasic acids; (d) Glycols; (e) Polyhydric alcohols; (f) Polybasic acids; (g) Hydroxy acids.

The synthetic lubricating oils of the complex ester type are grouped under one of four types as follows:

I. Monobasic acid-glycol-dibasic acid-glycol-monobasic acid
II. Alcohol-dibasic acid-glycol-dibasic acid-alcohol
III. Alcohol-dibasic acid-glycol-monobasic acid
IV. Alcohol-dibasic acid-glycol-dibasic acid-alcohol
V. Monobasic acid-glycol-dibasic acid-glycol-monobasic acid Representative formulas of the complex esters include:

$R_4COO-R_3-(OOCR_2COO-R_3)_n-OOCR_4$
$R_1-OOCR_2COO-(R_3-OOCR_2COO)_n-R_1$
$R_1-(OOCR_2COO-R_3)_n-OOCR_4$ wherein: $R_1$ represents alkyl radicals of a monohydric alcohol, $R_2$ represents hydrocarbon radicals of dicarboxylic acids, e.g. alkanedioic acids, $R_3$ represents divalent hydrocarbon or hydrocarbon-oxy radicals, such as $-CH_2(CH_2)_n-$, or $-CH_2CH_2(OCH_2CH_2)_n-$, or $-CH_2CH(CH_3)(OCH_2CH(CH_3))_m-$, derived from an alkylene glycol or polyalkylene glycol, while $R_4$ represents the alkyl group of a monocarboxylic acid. $n$ in the complex ester molecule will usually range from 1 to 6 depending upon the product viscosity desired which is controlled by the relative molar ratio of the glycol or polyglycol to the dicarboxylic acid.

Some specific materials used in preparing the above types of complex esters are as follows: alcohols having four to 13 carbon atoms such as n-butyl alcohol, 2-ethylbutyl alcohol, 2-ethylhexyl alcohol, n-hexyl alcohol, $C_8$ Oxo alcohol, $C_{10}$ Oxo alcohol, $C_{13}$ Oxo alcohol, etc., the corresponding fatty or monocarboxylic acids, $C_6$ to $C_{10}$ dibasic acids such as sebacic, adipic and azelaic; and glycols such as polyethylene glycol. In general the complex esters will have a total of 20 to 80, preferably 40 to 64, carbon atoms. These complex esters and methods for their preparation are known in the art and have been described in various patents.

The process of the present invention is also applicable to removing acidity from unsaturated esters such as the esters of fumaric acid, acrylic acid, methacrylic acid, maleic acid, and the like, which esters are polymerized, or copolymerized with other unsaturated material, to prepare additives for lubricating oils, fuels and fuel oils. Such additives function as flow improvers, viscosity index improvers, and the like.

The alcohols which are reacted with fumaric acid to form the fumarate esters will generally contain eight to 24 carbon atoms and include such alcohols as $C_{10}$ (decyl), $C_{12}$ (lauryl), $C_{14}$ (tetradecyl), $C_{18}$ (octadecyl), and $C_{22}$ (behenyl) alcohol. A mixture of two or more alcohols may also be employed in forming the fumarate ester. One suitable commercially available mixed alcohol is a product obtained by hydrogenation of tallow. Such alcohols generally contain up to about 98 percent or more of mixed hexadecyl and octadecyl alcohols, and about 2 percent or less of tetradecyl alcohol. Mixed alcohols obtained by hydrogenation of coconut oil (averaging from about $C_{12}$ to about $C_{14}$) may also be used for preparing fumarates. Other fumarates include those from octyl, decyl, cetyl, octadecyl, octyl or decyl mixed with cetyl or octadecyl, and mixed $C_8$, $C_{10}$, $C_{12}$, $C_{14}$, $C_{16}$, and $C_{18}$ alcohols having an average in the $C_{11}$ to $C_{14}$ range. When the alcohols in the fumarate ester average above about $C_{12}$, the copolymers are especially active as pour depressants or flow improvers. Other unsaturated esters include lauryl methacrylate, octadecyl acrylate, and dodecyl maleate.

Acidic catalysts which may be removed from the esters that are treated in accordance with this invention include inorganic acids such as hydrochloric acid, sulfuric acid, phosphoric acids, and the like as well as organic acids such as paratoluene sulfonic acid. Although alkaline earth oxides or hydroxides such as magnesium hydroxide or barium hydroxide will react with excess acids that are present in the esters of the types described, it is preferred not to use them because of their tendency to form ester-soluble metal salts which are not desired.

To render the slaked lime operable in the present invention, it is treated with or contacted with an ionizing liquid such as water, which is preferred, or a lower aliphatic alcohol, particularly one having from one to three carbon atoms, including methyl alcohol, ethyl alcohol and isopropanol. Methyl alcohol is the preferred non-aqueous ionizing liquid. The ionizing liquid should not be reactive with the ester. The amount of ionizing liquid that is added to the slaked lime is sufficient to effect ionization of at least a portion of the slaked lime but is less than sufficient to form a separate liquid phase. Generally the amount of water or other ionizing liquid that is used will be from about one-sixth to about four times the weight of the dry slaked lime. Satisfactory operation will usually be obtained when using from about one-fourth to about twice as much ionizing liquid as dry slaked lime. The lime can be treated with the water or other ionizing liquid before contacting the ester, or the water and lime can be added separately. The lime will make a slurry with the ester, which slurry after a very short time of contact can be filtered to remove the curd of lime and acidic constituents. Ordinarily the filtration can be done in the usual plate-and-frame press with the aid of a diatomaceous earth filtering medium or equivalent. The usual procedure is to cool the batch of ester after essentially all of the azeotroping solvent used in the esterification has been removed and then conduct the lime neutralization.

The amount of dry slaked lime used to treat the ester will be within the limits of about 0.3 to 10 parts by weight of the lime per 100 parts by weight of ester, preferably about 0.5 to 3 parts of lime per 100 parts of ester by weight. The time of contact between the ester and the alkaline earth treating agent will ordinarily be relatively short, i.e., from about 10 minutes to about 3 hours, or more usually in about 20 minutes to 1 hour. Normally, the treatment can be effected at ambient temperatures, although elevated temperatures may be desired, particularly when the ester tends to solidify at ambient temperatures. Moderately elevated temperatures, e.g., up to about 175°F. can be used. Proper fluidity for the neutralization treatment can be obtained also by diluting the ester with a solvent.

The nature of this invention and the manner in which it is practiced will be understood when reference is made to the following examples which include preferred embodiments.

EXAMPLE 1

There were placed in a 20-gallon Pfaudler kettle 28.1 lbs of tallow alcohol, 37.2 lbs of $C_8$ Oxo alcohol, 23.3 lbs fumaric acid (2 percent excess of theory) and 9 liters of heptane along with 136 milliliters of 97 percent sulfuric acid as catalyst for the reaction. The mixture was heated to reflux temperature and a stream of nitrogen was sparged into the mixture continuously during the reaction. Water that formed during the esterification reaction was removed as an azeotrope with the heptane. The reaction was continued until essentially the theoretical amount of water of esterification had been obtained overhead in the azeotrope. The theoretical yield of water was 3.21 liters and there was actually obtained 3.16 liters of water. At the conclusion of the esterification reaction the remaining heptane as removed by distillation, after which the reaction hatch was cooled to 150°F., and the acid catalyst and excess fumaric acid were then removed by neutralization. This was done by adding 653 grams of dry calcium hydroxide and 370 milliliters of water. This amount of water was roughly 1 wt. % of the weight of the ester. The mixture was agitated for 2 to 3 hours and then about 2 wt. % of diatomaceous earth filter aid was added, based on the mixture, and the batch was filtered to separate the calcium hydroxide curd from the treated batch of ester.

EXAMPLE 2

The procedure of Example 1 was followed to prepare an ester from 400 grams of $C_{13}$ Oxo alcohol, and 122.5 grams of fumaric acid, using 130 grams of heptane as the azeotroping solvent and 10.5 grams of p-toluene sulfonic acid as catalyst and 0.06 gram of hydroquinone to prevent polymerization. Neutralization of the ester product was conducted with about 2 wt. % of slaked lime and about 1 wt. % of water, based on the ester, using the procedure of Example 1, i.e. forming a slurry with the slaked lime and filtering.

EXAMPLE 3

A mixture of $C_8$ Oxo alcohol fumarate esters and tallow alcohol fumarate esters in about equal molar proportions was prepared in the same manner as in Example 1. After the reaction mixture had been stripped of azeotroping solvent and cooled to 140°F., the batch was mixed with 2 wt. % of dry slaked lime and with 3 wt. % of water, based on the total weight of esters, to remove residual sulfuric acid which had been employed as catalyst. The slurry was stirred for about 1 hour at room temperature and then was filtered. The total treating time including the filtration step was 3 hours. The treated ester had a neut. number of 0.05 mg. of KOH per gram and a metals content of less than 5 ppm. The esters before treatment had a neut. number of 15 mg. of KOH per gram.

COMPARATIVE EXAMPLE A

Using the same procedure as in Example 3, the mixed esters were contacted with 2 wt. % of dry, slaked lime to which no water had been added and the slurry was formed as in Example 3 and filtered by the same procedure. The total treating time including filtration as about 3 hours. The neutralization number of the filtered ester was 5.63 mg. of KOH per gram. The metals content was less than 5 ppm.

COMPARATIVE EXAMPLE B

An additional quantity of the mixed fumarate esters described in Example 3 was subjected to the conventional prior art process of caustic washing and water washing prior to removal of residual azeotroping solvent. This procedure included a hot water washing step, then two to three caustic washing steps wherein in each step the ester was contacted with one-half volume of 25 percent aqueous caustic per volume of ester at a temperature of 140°F. for a period of one-half hour followed by two successive water washing treatments using about one-half to 1 volume of water per volume of ester. Residual azeotroping solvent was removed after the final washing step. Following each caustic treating step it was necessary to allow the mixture of caustic and ester to settle in order to separate the emulsion. Separation times of 30 minutes to 1 hour were necessary in each of the washing steps. The total time for processing the esters was 14 hours. The neut. number of the ester that had been subjected to the multiple washing procedure was 0.04 mg. of KOH per gram and the metals content was greater than 5 but less than 10 ppm.

The above comparative examples and Example 3 demonstrate the advantages of the present invention with respect to ease and rapidity of treatment and avoidance of undesired metals content in the neutralized ester. Comparative Example A shows the necessity for the ionizing liquid to effect neutralization. Comparative Example B establishes that the conventional caustic and water washing procedure is much more laborious and time-consuming than the process of the present invention and that it moreover introduces more metal into the ester than does the present process.

EXAMPLE 4

A mixture was prepared consisting of 1,000 pounds of behenyl alcohol, 187 pounds of fumaric acid (2 percent excess of theory), 60 pounds of hexane and 3.8 pounds of toluene. All of the reactant were charged to a reactor and the solid mixture was heated to refluxing temperature. The reactor was supplied with an agitator which was turned on when the mixture had become fluid. Then 3.9 pounds of sulfuric acid was added and the temperature was gradually increased from the reflux temperature of about 170°F. until a final temperature of 280°F. was reached. Water formed during the reaction was removed as an azeotrope with the hexane. The progress of the reaction as followed by measuring the water obtained overhead in the azeotrope and by periodic measurements of the acidity of the reaction mixture. When it had been determined that the reaction was completed, the reaction mixture was cooled to about 150°–160°F. Neutralization of the sulfuric acid catalyst was then brought about by adding 254 pounds of hexane, 11.2 pounds of dry slaked lime and 3 pounds of water.

A copolymer useful as a flow improver for a heavy fuel oil was prepared by mixing the ester with 70.5 pounds of vinyl acetate and 3 pounds of benzoyl peroxide, heating the mixture under reflux at 160°–180°F., adding a second charge of 30 pounds of vinyl acetate and 1 pound of benzoyl peroxide after about 5 to 6 hours and continuing the polymerization until the desired copolymer was obtained as determined by polarograph measurements, which served to indicate when no unpolymerized fumarate ester remained. Hexane was stripped from the polymerized product by heating, and the product was blended into a solvent neutral mineral lubricating oil of 150 SUS viscosity (at 100°F.) to form a 50 wt. % concentrate of additive, 75 pounds of diatomaceous earth filter aid was added and the product as then filtered through a plate and frame filter press.

This example serves to illustrate an alternative procedure wherein polymerization of the neutralized ester is possible in the presence of the added lime, filtration being conducted later. Filtration could of course have been performed before the polymerization step.

A complex ester prepared from a glycol, a monohydric alcohol, and a dibasic acid can be treated in accordance with the present invention to remove residual acidity therefrom. Specifically a mixture of 100 grams of adipic acid, 87 grams of 2-ethyl hexanol, 30 grams of 1,3-butylene glycol, and 70 cc of xylene is heated under reflux under conditions arranged to carry water of esterification overhead with the xylene. When esterification is complete as indicated by the amount of water collected, the ester product is cooled to 100°F., slurried with 2.5 percent of its weight of dry slaked lime and 1.5 percent of its weight of water and slurry filtered as described above.

The foregoing examples are by way of illustration and not limitation. Modifications thereof within the scope of the invention will be apparent to those skilled in the art.

What is claimed is:

1. A process for reducing acidity in an ester of an aliphatic carboxylic acid and an aliphatic monohydric or polyhydric alcohol, which includes the steps of preparing a slurry of from 0.3 to 10 parts by weight of solid dry slaked lime or calcium hydroxide with 100 parts by weight of said ester in the presence of a small quantity of an ionizing liquid, said quantity being from about one-sixth to four times the quantity of dry slaked lime or calcium hydroxide, there being less of said ionizing liquid than an amount that will furnish a separate liquid phase, and thereafter filtering said slurry in the presence of said added ionizing liquid, said ionizing liquid being selected from the group consisting of water and a $C_1$ to $C_3$ aliphatic alcohol.

2. Process as defined by claim 1 wherein said ester is an unsaturated ester.

3. Process as defined by claim 1 wherein said ester is a fumarate ester of a $C_8$ to $C_{24}$ aliphatic alcohol.

4. Process as defined by claim 1 wherein said ester being treated contained residual sulfuric acid that was used as catalyst in preparing said ester.

5. Process as defined by claim 1 wherein said ester being treated contains p-toluene sulfonic acid that was used as catalyst in preparing said ester.

* * * * *